United States Patent
Nguyen et al.

(10) Patent No.: US 10,656,955 B1
(45) Date of Patent: May 19, 2020

(54) MODIFYING READABLE AND FOCUSABLE ELEMENTS ON A PAGE DURING EXECUTION OF AUTOMATED SCRIPTS

(71) Applicant: Capital One Service, LLC, McLean, VA (US)

(72) Inventors: Vu Nguyen, Pittsburg, CA (US); Jonatan Yucra Rodriguez, San Francisco, CA (US); Adam Vukich, Alexandria, VA (US); Joshua Edwards, Philadelphia, PA (US); David Gabriele, New York, NY (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/413,169

(22) Filed: May 15, 2019

(51) Int. Cl.
| | |
|---|---|
| *G06F 9/451* | (2018.01) |
| *G06F 16/958* | (2019.01) |
| *G06F 3/0489* | (2013.01) |
| *G06F 3/0484* | (2013.01) |
| *G06F 40/14* | (2020.01) |
| *H04L 29/08* | (2006.01) |

(52) U.S. Cl.
CPC ............ *G06F 9/451* (2018.02); *G06F 3/0489* (2013.01); *G06F 3/04842* (2013.01); *G06F 3/04895* (2013.01); *G06F 16/986* (2019.01); *G06F 40/14* (2020.01); *H04L 67/02* (2013.01)

(58) Field of Classification Search
CPC .. G06F 9/451; G06F 3/04895; G06F 3/04842; G06F 16/986; G06F 17/2247; G06F 3/0489
See application file for complete search history.

(56) References Cited

U.S. PATENT DOCUMENTS

| | | | | |
|---|---|---|---|---|
| 7,620,890 B2 * | 11/2009 | Dietl | ................... | G06F 16/9577 715/234 |
| 8,667,468 B2 * | 3/2014 | Breeds | ................ | G06F 11/3684 717/105 |

(Continued)

OTHER PUBLICATIONS

John Pallett, Improving Autoplay in Chrome, available at https://www.blog.google/products/chrome/improving-autoplay-chrome/ (May 3, 2018).*

(Continued)

*Primary Examiner* — Justin R. Blaufeld
(74) *Attorney, Agent, or Firm* — Harrity & Harrity, LLP

(57) ABSTRACT

A device may initiate an automated script to perform one or more interactions with a browser application and identify a first element in a page rendered by the browser application that satisfies one or more accessibility criteria, wherein the first element may include text that is readable by a screen reader application and/or an attribute that causes the first element to be navigable using a keyboard. The device may modify the first element to be inaccessible to the screen reader application and the keyboard and insert, into the page, a second element including text that is readable by the screen reader application to describe the one or more interactions that the automated script is performing. The client device may restore the page to an original state based on determining that the automated script has finished executing.

20 Claims, 10 Drawing Sheets

(56) References Cited

U.S. PATENT DOCUMENTS

| | | | | |
|---|---|---|---|---|
| 8,862,985 | B2* | 10/2014 | Gallo | G09B 21/003 |
| | | | | 715/234 |
| 10,185,464 | B2* | 1/2019 | Pereira | G06F 3/04817 |
| 2003/0101234 | A1* | 5/2003 | McBrearty | H04L 29/06 |
| | | | | 709/218 |
| 2008/0177800 | A1* | 7/2008 | Arkhipov | G06F 9/451 |
| 2009/0319927 | A1* | 12/2009 | Beeman | G06F 40/166 |
| | | | | 715/764 |
| 2011/0197124 | A1* | 8/2011 | Garaventa | G06F 16/972 |
| | | | | 715/234 |
| 2014/0200426 | A1* | 7/2014 | Taub | A61B 5/14532 |
| | | | | 600/347 |
| 2016/0261475 | A1* | 9/2016 | Jadhav | G06F 16/95 |
| 2016/0349959 | A1* | 12/2016 | Pereira | G06F 3/04817 |

OTHER PUBLICATIONS

Roger Johansson, "Hiding visible content from screen readers with aria-hidden", https://www.456bereastreet.com/archive/201205/hiding_visible_content_from_screen_readers_with_aria-hidden/, May 31, 2012, 2 pages.

Gabriele Strache, "CSS in Action—Invisible Content Just for Screen Reader Users", https://webaim.org/techniques/css/invisiblecontent/, Dec. 11, 2014, 6 pages.

* cited by examiner

MODIFYING READABLE AND FOCUSABLE ELEMENTS ON A PAGE DURING EXECUTION OF AUTOMATED SCRIPTS

BACKGROUND

A browser extension or an application may execute a script (e.g., code written in a scripting language, such as JavaScript and/or the like) to perform one or more operations in association with a web browser or the application. For example, the script can be loaded, injected, or otherwise executed in a context of a particular web page, and the script may access and manipulate elements of the web page. Accordingly, scripts can be used to improve layout, automate routine or repetitive tasks (e.g., form filling), add new functions, and/or the like.

SUMMARY

According to some implementations, a method may include initiating, by a device, an automated script to perform one or more interactions with a browser application executing on the device. The method may include identifying, by the device, a set of elements in a page rendered by the browser application that satisfy one or more accessibility criteria. The set of elements may include at least one content element that includes text readable by a screen reader application executing on the device and at least one focusable element that is navigable using a keyboard associated with the device. The method may include modifying, by the device, content on the page to make the text associated with the at least one content element inaccessible to the screen reader application and to make the at least one focusable element inaccessible using the keyboard associated with the device. The method may include inserting, by the device, at least one explanatory element into the page based on the one or more interactions that the automated script is performing. The at least one explanatory element may include text that is readable by the screen reader application to describe the one or more interactions that the automated script is performing, and the at least one explanatory element may be navigable using the keyboard associated with the device.

According to some implementations, a device may include one or more memories and one or more processors communicatively coupled to the one or more memories. The one or more processors may be configured to initiate an automated script to perform one or more interactions with a browser application executing on the device. The one or more processors may be configured to identify a first element in a page rendered by the browser application that satisfies one or more accessibility criteria. The first element may include text that is readable by a screen reader application executing on the device or an attribute that causes the first element to be navigable using a keyboard. The one or more processors may be configured to modify the first element to be inaccessible to the screen reader application and the keyboard. The one or more processors may be configured to insert, into the page, a second element that is readable by the screen reader application based on the one or more interactions that the automated script is performing. The second element may include text to describe the one or more interactions that the automated script is performing. The one or more processors may be configured to restore the page to an original state based on determining that the automated script has finished executing.

According to some implementations, a non-transitory computer-readable medium may store one or more instructions that, when executed by one or more processors, may cause the one or more processors to initiate a script to automate one or more interactions with a browser application. The one or more instructions may cause the one or more processors to identify, in a page rendered by the browser application, a set of elements that include text readable by a screen reader application. The one or more instructions may cause the one or more processors to insert at least one explanatory element into the page based on the one or more interactions that the script is performing. The at least one explanatory element may include text that is readable by the screen reader application to describe the one or more interactions that the script is performing. The one or more instructions may cause the one or more processors to modify a document object model associated with the page to make the text associated with the set of elements inaccessible to the screen reader application and to make the text associated with the at least one explanatory element accessible to the screen reader application. The one or more instructions may cause the one or more processors to provide information related to an original state of the document object model and one or more modifications to the document object model to a device configured to derive one or more accessibility criteria for modifying page elements based on the information related to the original state of the document object model and the one or more modifications to the document object model.

DETAILED DESCRIPTION

Figure 1A:
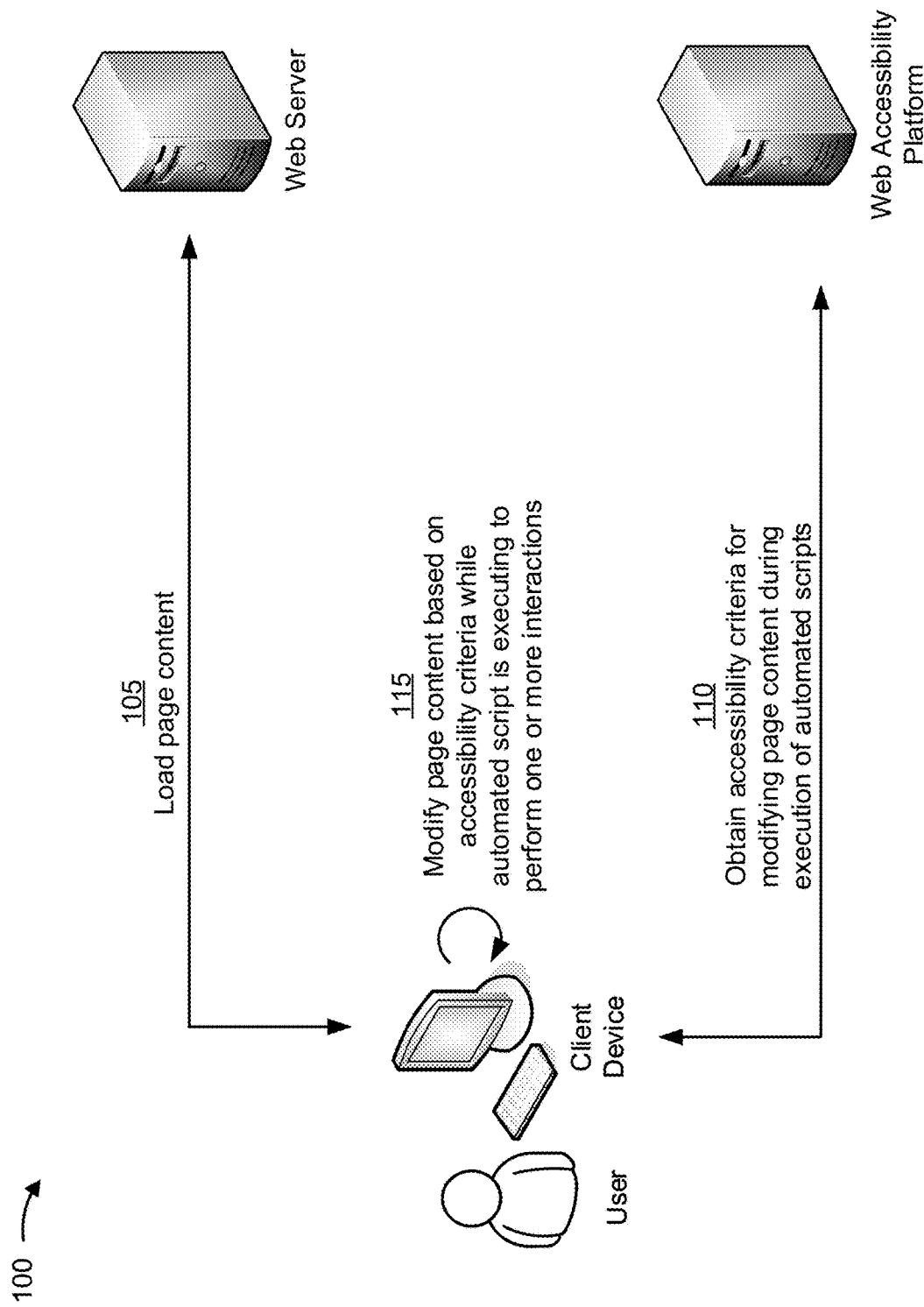
FIGS. 1A-1E are diagrams of one or more example implementations described herein.

The following detailed description of example implementations refers to the accompanying drawings. The same reference numbers in different drawings may identify the same or similar elements.

In human-computer interaction, computer accessibility refers to the accessibility of a computer system to all people, even those with disabilities or impairments. One area in which accessibility design principles are often considered is in context with access to web content. Web accessibility design principles (e.g., as described in the Web Content Accessibility Guidelines (WCAG) published by the Web Accessibility Initiative (WAI) of the World Wide Web Consortium (W3C)) are generally intended to ensure that there are no barriers that prevent interaction with or access to web content for people with disabilities (e.g., visual impairments, motor or dexterity impairments, hearing impairments, cognitive impairments, and/or the like). For example, coding a web page with semantically meaningful content (e.g., textual equivalents for images, meaningfully named links, and/or the like) may help visually impaired users access the content using a screen reader (e.g., text-to-speech software, text-to-Braille hardware, and/or the like). In another example, when links are underlined or otherwise differentiated from other text on the web page, the links may be more noticeable to visually impaired or color-blind users. In another example, web pages may be coded in a way to enable navigation using a keyboard alone to help users who cannot use a mouse or a standard keyboard due to motor impairments.

Another technique that can be used to improve web accessibility is through browser automation. In particular, a browser application executing on a client device can be configured to execute one or more automated scripts (sometimes referred to as content scripts, user scripts, and/or the like) to perform one or more interactions with the browser application and/or a page that is loaded in the browser application. For example, the interactions performed by the automated script may include input interactions (e.g., keystrokes, mouse movements, button clicks, menu selections, hover states, form submissions, and/or the like), opening and/or closing browser windows and/or browser tabs, navigating pages, and/or the like. In this way, the automated script can mimic human-computer interactions to carry out certain workflows without user intervention, which can improve access to web content for users who may have difficulty seeing, hearing, understanding, and/or using input devices to interact with web content.

Although browser automation can be used to assist users with performing repetitive or repeatable interactions (or sequences of interactions) and thereby improve accessibility, browser automation tools also tend to introduce certain accessibility challenges. For example, an automated script may introduce accessibility challenges that relate to navigation (e.g., an inability or difficulty to navigate web pages using a keyboard or assistive technology), hidden content (e.g., injecting or presenting content or functionality that is not visible and/or accessible to assistive technologies such as a screen reader), an inability or difficulty for a user to control automated content changes, confusion and/or disorientation (e.g., altering or disabling normal browser functionality and/or triggering actions that the user may be unaware of), and/or the like.

Accordingly, while browser automation can be employed to automatically perform certain actions, interactions, and/or the like that the user would otherwise have to perform, which may benefit users with certain impairments, the automation can inadvertently create confusion regarding what is happening, especially for users using accessibility tools. For example, a screen reader may read various tags or other elements on the page that are not relevant to the action(s) that the automated script is performing, elements or other information that the automated script injects into the page, and/or the like. In some cases, where the user is disoriented, confused, or otherwise unaware of what is happening in the browser, the user may have a poor experience that may fail to comply with accessibility design guidelines (e.g., to present information and user interface components in a manner that users can perceive, to ensure that user interface components and navigation are operable and/or understandable, to format content in a manner that can be reliably interpreted by various user agents, including assistive technologies).

In some cases, the confusion and/or disorientation that a user experiences while an automated script is running may result in substantial wasted computing resources (e.g., processor resources, memory resources, communication resources, and/or the like). For example, the user may attempt to perform certain actions while the automated script is running, which may cause the automated script to be unsuccessful and thereby waste computing resources by having to roll back changes that the automated script applied, attempt to execute the automated script again, and/or the like. In another example, user intervention that causes an automated script to fail may also lead the user to incorrectly assume that certain actions were successfully performed, which can lead to wasted resources where subsequent user actions are based on a false understanding of the state of a browsing session (e.g., attempting to access an account history even though an automated script was unable to successfully log into the account). Furthermore, the confusion and/or disorientation could escalate to a point where the user starts a communication session (e.g., a telephone call, an online chat, and/or the like) with customer service personnel to ask for help, which can also consume device resources, network resources, and/or the like. For example, customer service personnel may be unable to reassure users that automated interactions were successful, which may lead to wasted computing resources (e.g., helping the user to investigate whether the script completed the intended workflow). In other cases, customer service personnel may have no knowledge about the automated script, which can lead to the communication session between the user and the customer service personnel wasting computing resources without any resolution to the underlying issue that caused the confusion and/or disorientation.

Some implementations described herein may automatically modify content on a page loaded in a browser application according to one or more accessibility criteria while an automated script is executing to perform one or more automated interactions with the browser application. For example, a browser extension, a plug-in, or another application providing a runtime environment for the automated script may identify a set of elements in the page that satisfy the one or more accessibility criteria (e.g., elements that provide text alternatives for images or other non-text content, elements that make functionality triggered by mouse or gesture available via keyboard, and/or the like), and the identified set of elements may be temporarily modified to reduce confusion to users that may be using assistive technology such as a screen reader, a keyboard to navigate the page, and/or the like. For example, elements that provide text alternatives, elements that enable keyboard navigation, and/or the like may be temporarily removed, and additional elements that provide text to explain the interactions that the automated script is performing may be temporarily inserted, emphasized, and/or the like.

In this way, the content on the page may be modified while the automated script is executing, to remove or decrease a focus on elements that may not be relevant to the interactions that the automated script is performing, and to insert or increase a focus on elements that may explain the interactions that the automated script is performing. In this way, the user may be less likely to be confused or disoriented while the automated script is executing, which helps to ensure that the execution of the automated script complies with various accessibility guidelines (e.g., to ensure that information provided by a script is identified with functional text that can be accessed and read using assistive technology when the script displays content, creates user interface elements, performs automated interactions, and/or the like). This also conserves computing resources that would otherwise be wasted or consumed by the user intervening during script execution and potentially causing the script to fail, attempting to execute the script multiple times, contacting customer service personnel, and/or the like.

FIGS. 1A-1E are diagrams of one or more example implementations 100 described herein. As will be described in further detail herein, example implementation(s) 100 may include a client device that may execute a browser application and one or more automated scripts to automate one or more interactions with the browser application, a web server that may host or otherwise serve web pages to the browser application executing on the client device, and a web accessibility platform that may communicate with the client device to provide and/or obtain information that relates to one or more accessibility criteria for modifying content of the web pages displayed in the browser application while the client device is executing the one or more automated scripts to automate the one or more interactions with the browser application.

Figure 1B:
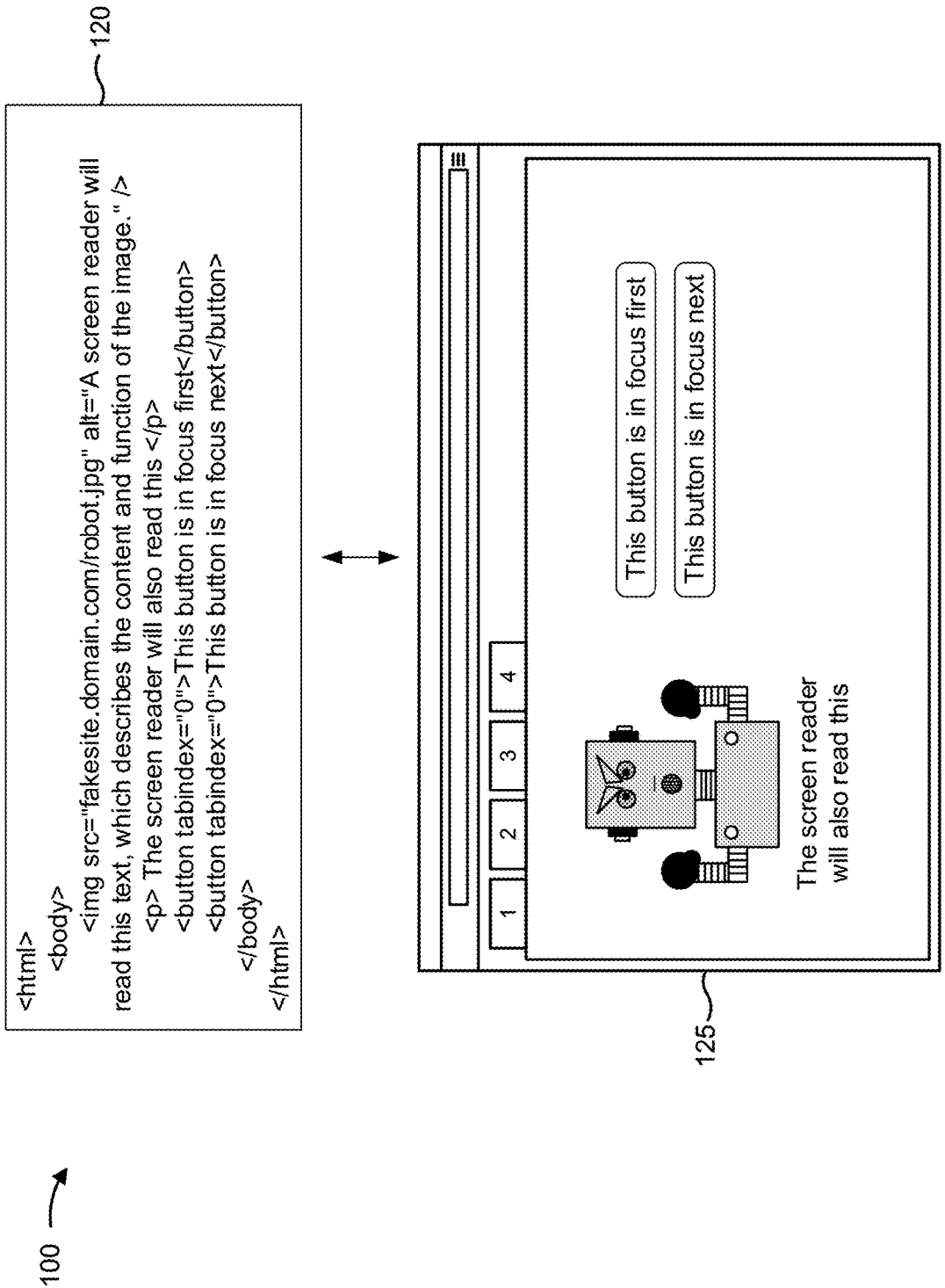
Figure 1C:
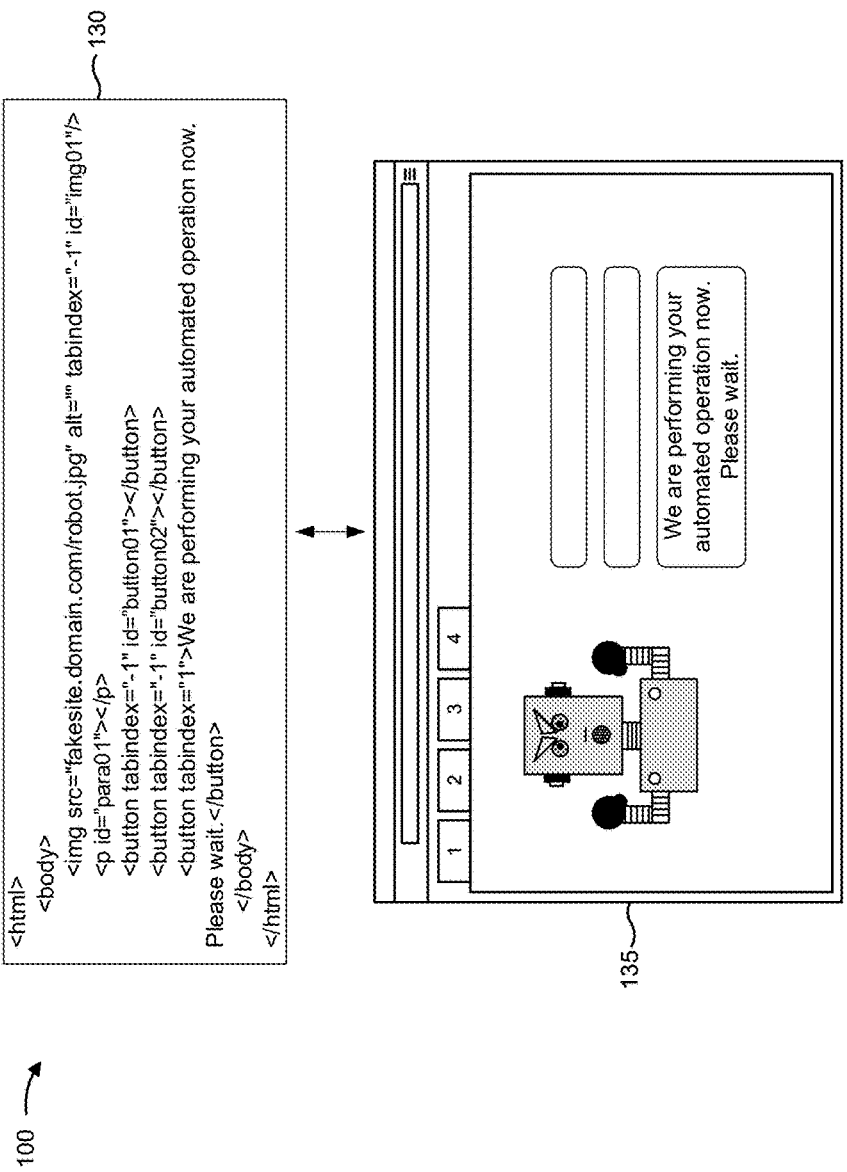
Figure 1D:
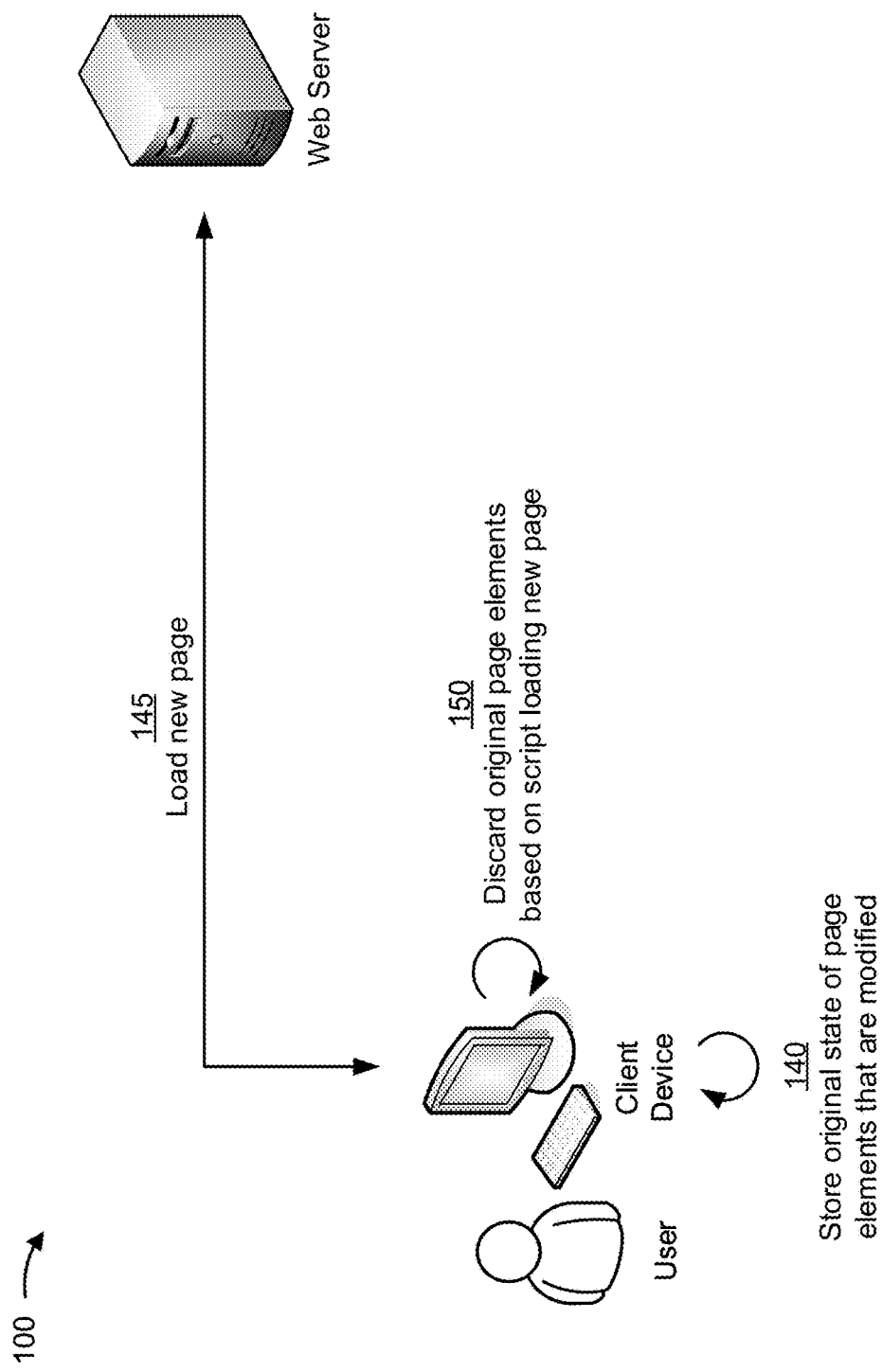
Figure 1E:
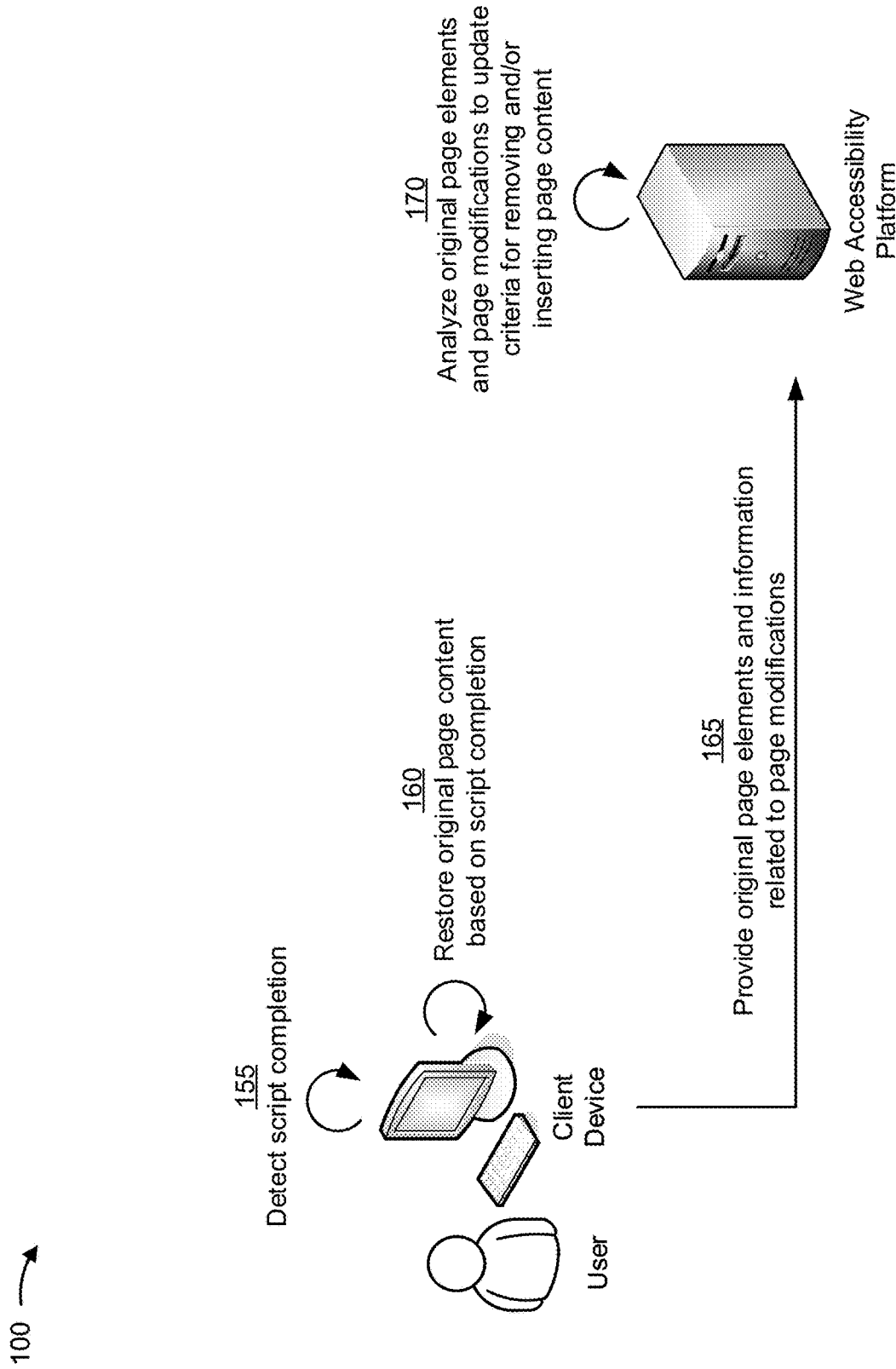

As shown in FIG. 1A, the client device may modify content associated with a page displayed in a browser application while an automated script is executing on the client device based on one or more accessibility criteria that are configured to emphasize and/or explain functionality of the automated script and to decrease a focus and/or disable access to other elements that may not be relevant to the functionality of the automated script. For example, as shown in FIG. 1B, a page may include one or more content elements that contain text that is readable by a screen reader application and/or focusable elements that are navigable by a keyboard. As shown in FIG. 1C, the content elements and/or focusable elements may be temporarily removed from the page or temporarily made inaccessible (e.g., to assistive technology tools such as the screen reader application, the keyboard, and/or the like) while the automated script is executing. As further shown in FIG. 1C, one or more readable and/or focusable elements may be inserted into the page to emphasize and/or explain the functionality of the automated script. As shown in FIG. 1D, the client device may discard original elements on the page based on determining that the automated script has loaded a new page. Additionally, or alternatively, as shown in FIG. 1E, the client device may restore the original elements on the page based on determining that the automated script has completed executing, and the client device may provide information related to the original page elements and/or modifications to the page to the web accessibility platform. Accordingly, the web accessibility platform may use the information related to the original page elements and/or the modifications to the page to update the one or more accessibility criteria used to modify page content while one or more automated scripts are executing.

As shown in FIG. 1A, and by reference number 105, the client device may communicate with a web server to load content associated with a web page. In particular, as mentioned above, the client device may be executing a browser application, and the browser application may request content associated with a particular web page from the web server. For example, a user of the client device may enter a Uniform Resource Locator (URL) into the web browser, which may obtain a web page corresponding to the URL from the web server by submitting a Hypertext Transfer Protocol (HTTP) request to the web server. The web server may provide, to the client device, a response to the HTTP request that includes content of the web page, status information relating to the HTTP request, and/or the like. Additionally, or alternatively, the HTTP request to obtain the web page may be initiated based on the user clicking a link in another web page, an email, a document, and/or the like. Once the content of the web page has been obtained, the browser application may render the content of the web page on the client device (e.g., in a particular tab where the browser application supports a tabbed document interface that allows multiple web pages to be contained in a single browser window).

As further shown in FIG. 1A, and by reference number 110, the client device may obtain one or more accessibility criteria for modifying content of pages rendered by the browser application during execution of automated scripts. For example, one web accessibility design principle may be to ensure that information and user interface components are presentable to users with impairments in a way that the users can perceive. Accordingly, web pages often include one or more elements that may enable visually impaired users to receive information via sound (e.g., using a screen reader application) and/or touch (e.g., using text-to-Braille hardware). For example, in Hypertext Markup Language (HTML), an "alt" attribute can be used to provide a text alternative for non-text content (e.g., images, buttons, icons, graphics, data represented on charts or diagrams, form controls, user interface components, and/or the like). In general, a text alternative may be readable by a screen reader application, which may enable visually impaired users to understand and/or interact with the element(s) associated with the text alternative.

However, while an automated script is executing, text accessible to the screen reader application may not be relevant to the functionality that the automated script is performing, which could lead to user confusion, disorientation, distraction, and/or the like if the screen reader application were to read all of the text accessible to the screen reader application. Accordingly, in some implementations, the one or more accessibility criteria may be used to identify content elements that include text that is accessible (e.g., readable) by a screen reader application, which may enable temporary modification of the content elements that include the text accessible to the screen reader application while the automated script is executing. For example, the one or more accessibility criteria may define elements, attributes, and/or the like that typically include or are otherwise associated with readable text (e.g., an alt attribute, regular text in an element section between an opening tag and a closing tag, a page title, a semantic header to assist in navigation, a link title, and/or the like). In some implementations, the content elements that include text accessible by the screen reader application may be temporarily modified (e.g., while an automated script is executing) to make the text inaccessible by the screen reader application.

In some implementations, another web accessibility design principle may be to ensure that functions that can be triggered via a mouse interaction or a gesture interaction can also be operated using a keyboard. For example, some users (e.g., with motor impairments, visual impairments, and/or the like) may not use a mouse and instead rely on a keyboard and/or hardware that mimics keyboard functionality to interact with web content. Accordingly, web pages often include one or more elements that enable keyboard navigation to access functionality such as form controls, input boxes, user interface components, and/or the like. In this way, the elements that enable keyboard navigation may improve accessibility for keyboard users (including people using alternative keyboards such as keyboards with ergonomic layouts, on-screen keyboards, switch devices, and/or the like). Furthermore, the elements that enable keyboard access may assist people using voice recognition or speech inputs to operate websites and to dictate text through a keyboard interface. Further still, text alternatives can be used in combination with elements that enable keyboard access to provide contextual labels for controls and functionality in order to aid navigation via keyboard, voice, and/or the like.

In some implementations, the elements that enable keyboard navigation may include one or more "tabindex"

attributes, which are generally used to indicate whether an element can be focused, if and/or where the element is located in a sequence of elements navigable using the keyboard (e.g., using a "Tab" key), and/or the like. For example, the tabindex attribute is generally associated with an integer value, where an element having a tabindex attribute equal to zero (0) is focusable in sequential keyboard navigation in a default focus order (e.g., determined according to a position of the element in the source HTML). Where the element has a positive value for the tabindex attribute, the element is focusable in sequential keyboard navigation and a position of the element in the sequence of elements navigable using the keyboard is determined based on the value for the tabindex attribute (e.g., an element having a tabindex equal to one (1) will be in focus before an element having a tabindex equal to two (2)). However, where the element has a negative value for the tabindex attribute, the element may be focusable but not accessible by sequential keyboard navigation. In other words, an element with a negative tabindex attribute may be omitted from the sequence of elements navigable using the keyboard.

Additionally, or alternatively, the elements that enable keyboard navigation may include interactive elements that are natively navigable using a keyboard (e.g., without a tabindex attribute being required in order to give the element keyboard focus). For example, in HTML, interactive elements that are natively navigable using a keyboard may include links, buttons, form controls, and/or the like. Additionally, or alternatively, the elements that enable keyboard navigation may include one or more "accesskey" attributes used to assign keyboard shortcuts to the elements that include the accesskey attribute(s). For example, the accesskey attribute can be included within a particular element to define a keyboard shortcut that will navigate directly to the particular element (e.g., an element including attribute accesskey="s" may be accessed by a keyboard shortcut in which a user presses "s" in combination with one or more activation keys, such as Alt, Shift+Alt, Control+Option, and/or the like).

However, while an automated script is executing, one or more elements that are focusable, navigable, or otherwise accessible using a keyboard may not be relevant to the functionality that the automated script is performing, which could lead to user confusion, disorientation, distraction, and/or the like. For example, if the client device is executing a screen reader application, the screen reader application would read text associated with each element that the user accesses (or "tabs" to) using the keyboard, and the text may be irrelevant to the functionality that the automated script is performing. Additionally, or alternatively, one or more of the elements that are accessible using the keyboard may be interactive (e.g., buttons, hyperlinks, and/or the like), and allowing keyboard access to an interactive element may result in the user selecting or otherwise interacting with the element in a manner that interferes with the functionality that the automated script is performing. For example, the automated script may be configured to automatically navigate a sequence of pages to swap a credit card that the user has on-file at a particular website, and allowing the user to tab to an interactive element and select the interactive element may cause the browser to navigate away from the sequence of pages used to swap the user's credit card. Accordingly, in some implementations, the one or more accessibility criteria may be used to identify focusable elements that are navigable using a keyboard, which may be temporarily modified to be made inaccessible to the keyboard while the automated script is executing.

In some implementations, the accessibility criteria for modifying page content may be used to identify other elements, attributes, and/or the like that may cause user confusion, user disorientation, user distraction, functional interference, and/or the like while an automated script is executing. For example, in addition to providing criteria for identifying text content that is accessible to a screen reader application and/or focusable elements that the user may traverse using a keyboard, the accessibility criteria may include one or more indicators to handle interactive (e.g., clickable) elements, advertising content, multimedia content, and/or the like. For example, the accessibility criteria may include one or more indicators for identifying interactive elements such as links, buttons, form controls, and/or the like, and a type of tag associated with the interactive elements may be modified to make the interactive elements hidden from the screen reader application, inaccessible using the keyboard, and unselectable (e.g., a button may be temporarily changed to a different user interface component that does not appear clickable, a link may be temporarily changed to a non-interactive element such as a span element, and/or the like). In another example, multimedia content (e.g., advertising content, embedded video and/or audio content, and/or the like) often has visual and/or auditory characteristics that are not designed with screen readers or other assistive technology in mind. Accordingly, in some implementations, the accessibility criteria may include one or more indicators for detecting multimedia content (e.g., based on an inline frame or "iframe" that represents a nested browsing context embedded in a current web page, an identifier of a third-party from which the content originates, and/or the like), which may be modified to be inaccessible to the screen reader application, to be inaccessible via keyboard navigation, to be playable only by selection of a play button (e.g., with automatic play disabled), and/or the like.

As further shown in FIG. 1A, and by reference number 115, the client device may be configured to modify content on the page loaded from the web server based on the accessibility criteria obtained from the web accessibility platform. In particular, the client device may be executing a browser extension, a browser plug-in, and/or another suitable application that can be used to initiate an automated script to automatically perform one or more interactions with a browser application in which the page is loaded, and the content on the page may be modified while the automated script is executing to perform the one or more interactions. For example, in some implementations, the automated script can include a content script, a user script, a foreground script, and/or the like, which may execute in a context of a particular page and have permission to read and modify content of the particular page using one or more document object model (DOM) application program interfaces.

Furthermore, in some implementations, the automated script can be associated with a background script used to maintain long-term state and/or perform long-term operations independently of a lifetime of any particular web page or browser window. Accordingly, in some implementations, the client device may load and execute the background script when the browser extension, browser plug-in, and/or other suitable application is loaded, and the background script may be used to initiate and manage one or more automated scripts that execute in a context of particular pages (e.g., browser tabs). In some implementations, when the background script initiates the one or more automated scripts, the background script may modify the content on the page based on the accessibility criteria, instruct the foreground script to modify the content on the page based on the accessibility criteria, initiate a separate process to modify the content on the page based on the accessibility criteria, and/or the like.

In some implementations, the client device may obtain the automated script(s) from a repository associated with the web accessibility platform, a third-party repository, and/or the like. Additionally, or alternatively, the automated script(s) may be created locally at the client device (e.g., using a script editor that allows users to write custom script code, using a software utility that can record and subsequently replay user interactions such as button clicks, menu selections, hover states, form submissions, and/or the like). In some implementations, the automated script(s) may be initiated manually (e.g., based on a user command) or automatically based on a trigger event (e.g., when the page loaded from the web server has a URL that matches a given pattern, when a particular browser action is initiated, and/or the like).

In some implementations, the automated script(s) may be configured to perform one or more interactions at a graphical interface level in order to carry out one or more interactions that would normally be performed by a user (e.g., selecting links, selecting from a menu, typing into a text box, navigating through pages, extracting data from pages, and/or the like). In this case, the interactions performed by the automated script(s) may be visually perceptible, but the interactions may nonetheless cause confusion, disorientation, and/or the like because the user may not know what actions are being performed by the automated script(s). The potential confusion, disorientation, and/or the like may be worse in cases where the user is visually impaired, using accessibility tools, and/or the like because the user may not be able to perceive the actions that are being performed by the automated script(s).

Additionally, or alternatively, the automated script(s) may inject one or more inline frames (e.g., iframe elements) into a current page to create a nested browsing context embedded in the current page, and the automated script(s) can be executed within the nested browsing context to remain hidden from sight. However, if the actions being performed by the automated script(s) are hidden from sight, similar issues may arise in that the user may be unable to perceive the actions that are being performed by the automated script(s). Furthermore, depending on where the nested browsing context is placed within the page and/or a screen of the client device, accessibility tools such as screen reader applications may have difficulty finding the information injected into the nested browsing context.

Accordingly, in some implementations, the page content may be modified to focus on or otherwise emphasize the actions that are being performed by the automated script(s). For example, the page may be associated with a document object model (DOM) that represents the page using a tree structure. Each branch in the tree may end in a node, and each node may contain one or more objects. In some implementations, various programmatic methods (e.g., application program interfaces) can be used to access and manipulate elements of the DOM in order to change a structure, style, content, and/or other characteristics of the page. Accordingly, when an automated script is initiated to perform one or more interactions with a browser application (e.g., a particular page loaded in the browser application), the DOM associated with a page that the automated script is interacting with may be parsed to identify one or more elements, attributes, and/or the like that may cause user confusion, disorientation, and/or the like.

For example, as mentioned above, the DOM may be parsed to identify content elements containing text that is readable to a screen reader application and to identify focusable elements that are navigable using a keyboard. The content elements may be modified to be inaccessible to the screen reader application, and the focusable elements may be modified to be inaccessible using a keyboard. Additionally, or alternatively, multimedia elements may be disabled, or automatic play for multimedia elements may be disabled, and interactive elements may be made unselectable to prevent the user from initiating actions that may interfere with the actions being performed by the automated script. Furthermore, in some implementations, one or more explanatory elements may be inserted into the DOM to explain the actions being performed by the automated script. For example, the explanatory element(s) may include text to describe the actions being performed by the automated script, and the explanatory element(s) may further include one or more attributes that make the explanatory element(s) navigable using a keyboard.

In this way, by removing text and/or focus from existing elements on the page and inserting text and/or focus for explanatory elements that relate to the actions being performed by the automated script, the page content may be modified to focus on or otherwise emphasize the actions that are being performed by the automated script(s). For example, the user may press a tab key to navigate directly to the explanatory elements that relate to the actions being performed by the automated script, and the screen reader may read the text to describe the actions that the automated script is performing. In this way, the user may be informed about the actions being performed by the automated script without being distracted or confused by other page elements. For example, the DOM may be parsed to identify any elements that include text that is accessible to the screen reader (e.g., regular text on the page, text associated with an alt attribute, and/or the like), and original text may be removed from the page such that the screen reader application has nothing to read except for the explanatory elements that are inserted to explain the actions that the automated script is performing. Furthermore, any elements that are navigable using a keyboard may be associated with a tabindex attribute having a negative value to make the elements inaccessible using a keyboard, and the explanatory element may be associated with a tabindex attribute having a non-negative value to ensure that the explanatory element will be navigable using the keyboard. In some implementations, the non-negative value may be set to one (1) to ensure that the explanatory element will be first in a sequence of elements that are navigable using the keyboard.

In some implementations, when modifying the page content, an original state of one or more elements that are modified may be preserved, to enable restoration of the page content when the automated script has finished executing. For example, an element may be associated with an "id" attribute that specifies a unique identifier for the element within a context of the page (i.e., the id attribute is unique within the page). Accordingly, for an element that includes an id attribute, an original state of the element may be stored (e.g., in a cache associated with the browser application, a memory of the client device, the web accessibility platform, and/or the like) in association with the id attribute. Additionally, or alternatively, for an element that does not include an id attribute, a unique id attribute may be generated for the element and the original state of the element may be stored in association with the generated id attribute. In this way, an original state of the content on the page (e.g., prior to modification) may be cached, stored, or otherwise preserved, which may allow the original state of the content on the page to be restored when the automated script has finished executing.

In some implementations, multiple automated scripts may be executed sequentially and/or in parallel, or an automated script may execute on multiple pages (e.g., where the automated script is configured to navigate among different pages to carry out an intended function). In such cases, when the automated script loads a new page, the original state of the page that was modified may be discarded because the page is no longer being rendered by the browser application, and a background script may cause the automated script to perform the process of modifying content on the new page in a similar manner as described above.

Example implementation(s) 100 will now be described with reference to FIGS. 1B-1C, which illustrate example modifications to HTML, code that may be applied while an automated script is executing to emphasize and/or explain functionality of the automated script and to decrease a focus and/or disable access to other elements that may not be relevant to the functionality of the automated script. For example, as shown in FIG. 1B, and by reference number 120, an HTML page includes an image (img) element that has a source attribute to specify an address (e.g., a URL) of the image. The image element also includes an alt attribute that is accessible to a screen reader application, and which may be displayed in place of the image if the image file is not loaded (e.g., because the user has chosen to disable images, the image is unable to be loaded from the specified address, and/or the like). For example, as illustrated in FIG. 1B, the alt attribute includes the text "A screen reader will read this text, which describes the content and function of the image." The HTML, page shown in FIG. 1B also includes a paragraph element, which includes the text "The screen reader will also read this," and a pair of buttons that include readable text and tabindex attributes that define a sequence in which the buttons are navigable using a keyboard. Accordingly, as further shown in FIG. 1B, and by reference number 125, the HTML page may be rendered in a web browser. In particular, the image file is displayed in the web browser along with the text in the paragraph element, and the pair of buttons are further displayed in the web browser along with the readable text.

As shown in FIG. 1C, and by reference number 130, the content of the HTML page is modified when an automated script is executed to make original text inaccessible to the screen reader application, to make original focusable elements inaccessible using a keyboard, and to insert an explanatory element that describes the actions that the automated script is performing. For example, the text contained in the alt attribute of the image element has been removed (note that the alt attribute is empty to comply with standards requiring that each image have an alt attribute), the text from the subsequent paragraph element has been removed, and the text displayed within the buttons has been removed. Furthermore, each of these original elements has been associated with a tabindex having a negative value, which causes the corresponding element to be omitted from a sequence of elements that are navigable using a keyboard. Additionally, as shown by reference number 130, each original element that has been modified is associated with an id attribute that is unique within the HTML page. Accordingly, an original state of each element (e.g., as shown in FIG. 1B) may be cached or otherwise stored in association with the corresponding id attribute, which may enable the original state of each element to be subsequently restored when the automated script finishes executing.

In some implementations, in addition to modifying original elements to make original text inaccessible to the screen reader application and to make original focusable elements inaccessible using a keyboard, the HTML, page has been modified to include an explanatory element that describes the actions being performed by the automated script. In particular, as shown by reference number 130, a button element has been inserted into the page, and the button element includes the text "We are performing your automated operation now. Please wait." Accordingly, when a screen reader application processes the page as shown by reference number 135, the only text that remains accessible to the screen reader application is the text associated with the explanatory element. Furthermore, as shown by reference number 130, the explanatory element includes a tabindex having a value of one (1), which ensures that the explanatory element will be first in a sequence of elements that are navigable using a keyboard. Accordingly, if a user presses "tab" to navigate through the rendered page, focus will be initially directed at the explanatory element. In this way, if the user is using a keyboard to navigate the page, the only element to which the keyboard will navigate is the explanatory element. In this way, the user is not required to tab through the entire page looking for the explanatory element or to have the screen reader application read other elements that are not relevant to the actions being performed by the automated script.

As shown in FIG. 1D, and by reference number 140, the client device may store an original state of page elements that are modified (e.g., in a cache associated with the web browser, a memory of the client device, and/or the like) to enable subsequent restoration of the original state of the modified page elements. For example, in context with FIGS. 1B-1C, the client device may store an original state of the image element, the paragraph element, and the pair of button elements in association with respective identifier (id) attributes, which are inserted into the modified page elements. In some cases, one or more elements may originally include an identifier attribute, and an identifier attribute may be generated for any modified elements that do not have an existing identifier attribute. In this way, the original state of the page may be preserved, which may enable the original state of the page to be restored when the automated script has finished executing. However, in cases where the automated script navigates between different pages to perform a sequence of interactions across the different pages, the original state that is stored in cache, memory, and/or the like can be removed to conserve memory resources.

Accordingly, as shown in FIG. 1D, and by reference number 145, the automated script may communicate with a web server to load a new page. For example, the automated script may select a link in the previous page, submit a form via the previous page, and/or the like. As further shown in FIG. 1D, and by reference number 150, the original page elements may be discarded based on the automated script loading the new page. In this way, memory resources are conserved because the automated script has navigated away from the previous page associated with the original page elements that are stored in cache, memory, and/or the like.

As shown in FIG. 1E, and by reference number 155, the client device may detect that the automated script has completed executing. For example, the client device may execute a background script to maintain long-term state and/or perform long-term operations independently of a lifetime of any particular web page or browser window, and the background script may be configured to use one or more message passing application program interfaces to communicate with one or more automated content scripts, user scripts, foreground scripts, and/or the like that have direct access to web pages rendered in a particular browser window, browser tab, and/or the like. Accordingly, when the automated script has completed, the automated script may notify the background script via the message passing application program interface.

As further shown in FIG. 1E, and by reference number 160, the client device may cause an original state of content on the page to be restored based on the automated script completing. For example, the client device may retrieve an original page element from storage, determine an identifier attribute that is associated with the original page element, and use the original page element to replace an element in the modified page that includes the identifier attribute. This process may be repeated for each original page element that is preserved in storage, thus restoring the original page content.

As further shown in FIG. 1E, and by reference number 165, the client device may provide information related to the original page elements and information related to a set of modifications that were applied to the original page elements to the web accessibility platform. For example, the client device may provide the web accessibility platform with an original document object model (DOM) prior to applying any modifications, a modified version of the DOM after the modifications are applied, and/or the like. Additionally, or alternatively, the client device may provide information related to individual page elements that were modified. As further shown in FIG. 1E, and by reference number 170, the web accessibility platform may analyze the information related to the original page elements and the information related to a set of modifications that were applied to the original page elements to update the criteria for removing content from and/or inserting content into web pages while automated scripts are executing. For example, the web accessibility platform may employ one or more accessibility testing tools that can evaluate page content for accessibility problems, compliance with accessibility guidelines, and/or the like. In this way, the web accessibility platform may detect certain elements, attributes, coding styles, patterns, and/or the like that may potentially cause a user to be confused, disoriented, distracted, and/or the like while an automated script is executing, which may be used to update the criteria for removing and/or inserting page content to reduce a probability of such confusion, disorientation, distraction, and/or the like.

As indicated above, FIGS. 1A-1E are provided as one or more examples. Other examples may differ from what is described with regard to FIGS. 1A-1E.

Figure 2:
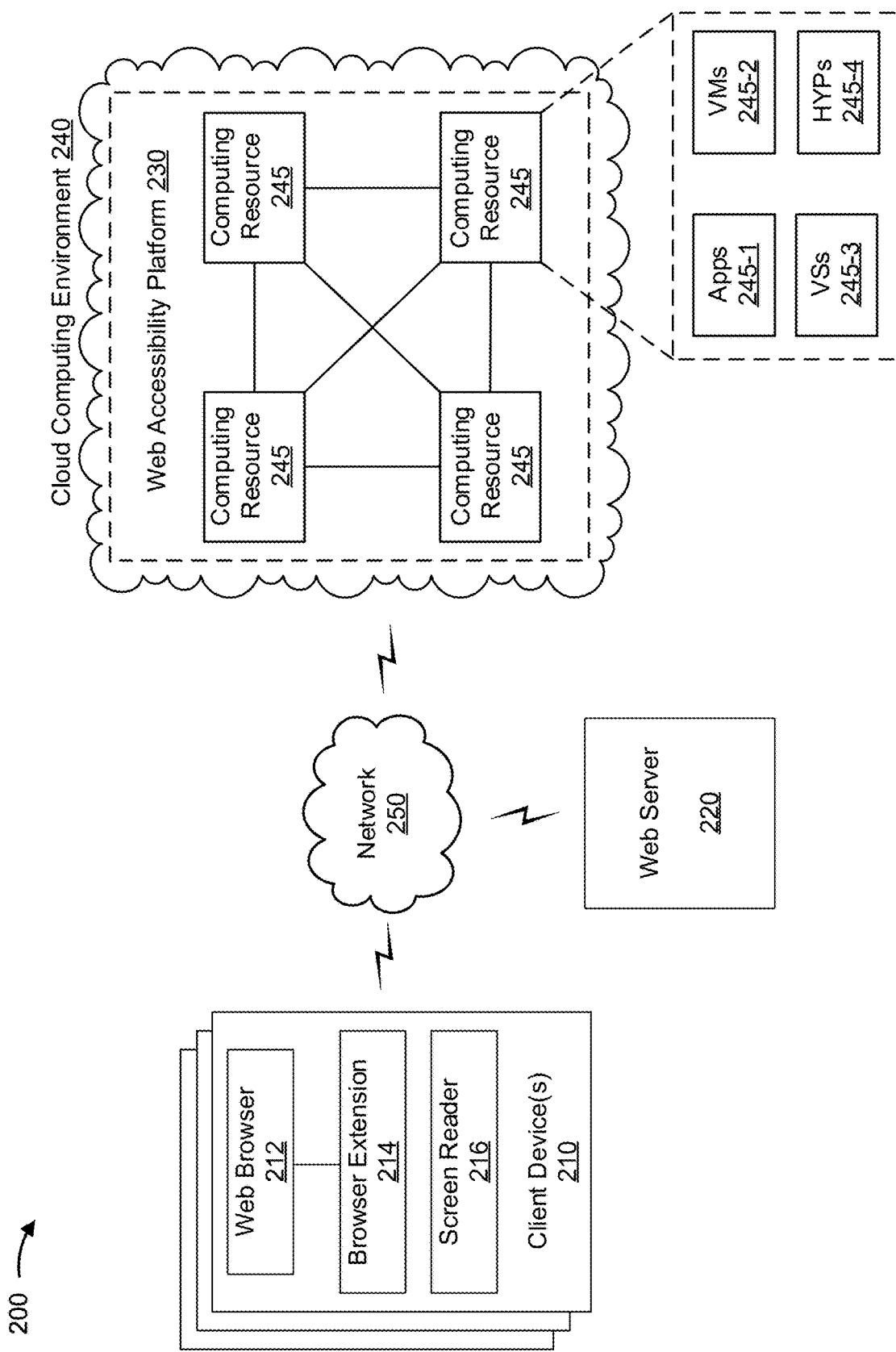
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 that may execute one or more applications (e.g., a web browser 212, a browser extension 214, a screen reader 216, and/or the like), a web server 220, a web accessibility platform 230 in a cloud computing environment 240 that includes a set of computing resources 245, and a network 250. Devices of environment 200 may interconnect via wired connections, wireless connections, or a combination of wired and wireless connections.

Client device 210 includes a device that supports web browsing and/or network access via an application. For example, client device 210 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. Client device 210 may host a web browser 212 and/or a browser extension 214 installed on and/or executing on the client device 210. Client device 210 may further host a screen reader 216 that can read information on a screen of client device 210, including content associated with one or more pages that are rendered by the web browser 212. Additionally, or alternatively, client device 210 may host one or more applications that permit access to a network (e.g., network 250), which may enable client device 210 to load web pages from web server 220, obtain automated scripts and/or accessibility criteria for modifying web pages loaded from web server 220 from web accessibility platform 230, and/or the like.

Web browser 212 includes an application, executing on client device 210, that supports web browsing. For example, web browser 212 may be used to access information on the World Wide Web, such as web pages, images, videos, and/or other web resources. Web browser 212 may access such web resources using a uniform resource identifier (URI), such as a uniform resource locator (URL), a uniform resource name (URN), and/or the like. Web browser 212 may enable client device 210 to retrieve and present, for display, content of a web page.

Browser extension 214 includes an application, executing on client device 210, capable of extending or enhancing functionality of web browser 212. For example, browser extension 214 may be a plug-in application for web browser 212. Browser extension 214 may be capable of executing one or more automated scripts (e.g., code, which may be written in a scripting language, such as JavaScript and/or the like) to perform an operation in association with web browser 212. For example, the automated script(s) may be initiated to automatically perform one or more interactions with web browser 212 (e.g., navigating pages, selecting links, inputting keystrokes, mimicking mouse movements, and/or the like).

Screen reader 216 includes an application, executing on client device 210, capable of converting digital text into synthesized speech. Additionally, or alternatively, screen reader 216 may interact with text-to-Braille hardware and/or other non-visual output modalities to allow the digital text to be perceived by a user who is blind, visually impaired, illiterate, cognitively impaired, and/or the like.

Web server 220 includes a device capable of serving web content (e.g., web documents, HTML, documents, web resources, images, style sheets, scripts, text, and/or the like). For example, web server 220 may include a server and/or computing resources of a server, which may be included in a data center, a cloud computing environment, and/or the like. Web server 220 may process incoming network requests (e.g., from client device 210) using HTTP and/or another protocol. Web server 220 may store, process, and/or deliver web pages to client device 210. In some implementations, communication between web server 220 and client device 210 may take place using HTTP.

Web accessibility platform 230 includes one or more devices capable of receiving, generating, storing, processing, and/or providing information associated with modifying web page content rendered by web browser 212 while browser extension 214 is executing one or more automated scripts. For example, as described elsewhere herein, web accessibility platform 230 may provide client device 210 with one or more accessibility criteria for identifying elements, attributes, and/or the like in a page that are to be modified while an automated script is executing (e.g., elements, attributes, and/or the like that contain text accessible by screen reader 216, elements that are navigable using a keyboard, and/or the like). In some implementations, web accessibility platform 230 may receive information from client device 210 that relates to one or more pages, elements, attributes, and/or the like that are modified while an automated script is executing, and web accessibility platform 230 may analyze the information received from client device 210 to update the accessibility criteria to reduce user confusion, disorientation, distraction, and/or the like that may occur while an automated script is executing.

In some implementations, as shown, web accessibility platform 230 can be hosted in a cloud computing environment 240. Notably, while implementations described herein describe web accessibility platform 230 as being hosted in cloud computing environment 240, in some implementations, web accessibility platform 230 can be non-cloud-based (e.g., can be implemented outside of a cloud computing environment) or partially cloud-based.

Cloud computing environment 240 includes an environment that hosts web accessibility platform 230. Cloud computing environment 240 can provide computation services, software services, data access services, storage services, and/or other services that do not require end-user knowledge of a physical location and configuration of system(s) and/or device(s) that host web accessibility platform 230. As shown, cloud computing environment 240 can include a set of one or more computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host web accessibility platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by client device 210, web server 220, and/or the like. Application 245-1 can eliminate a need to install and execute the software applications on client device 210, web server 220, and/or the like. For example, application 245-1 can include software associated with web accessibility platform 230 and/or any other software capable of being provided via cloud computing environment 240. In some implementations, one application 245-1 can send information to and/or receive information from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of client device 210, web server 220, and/or the like), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
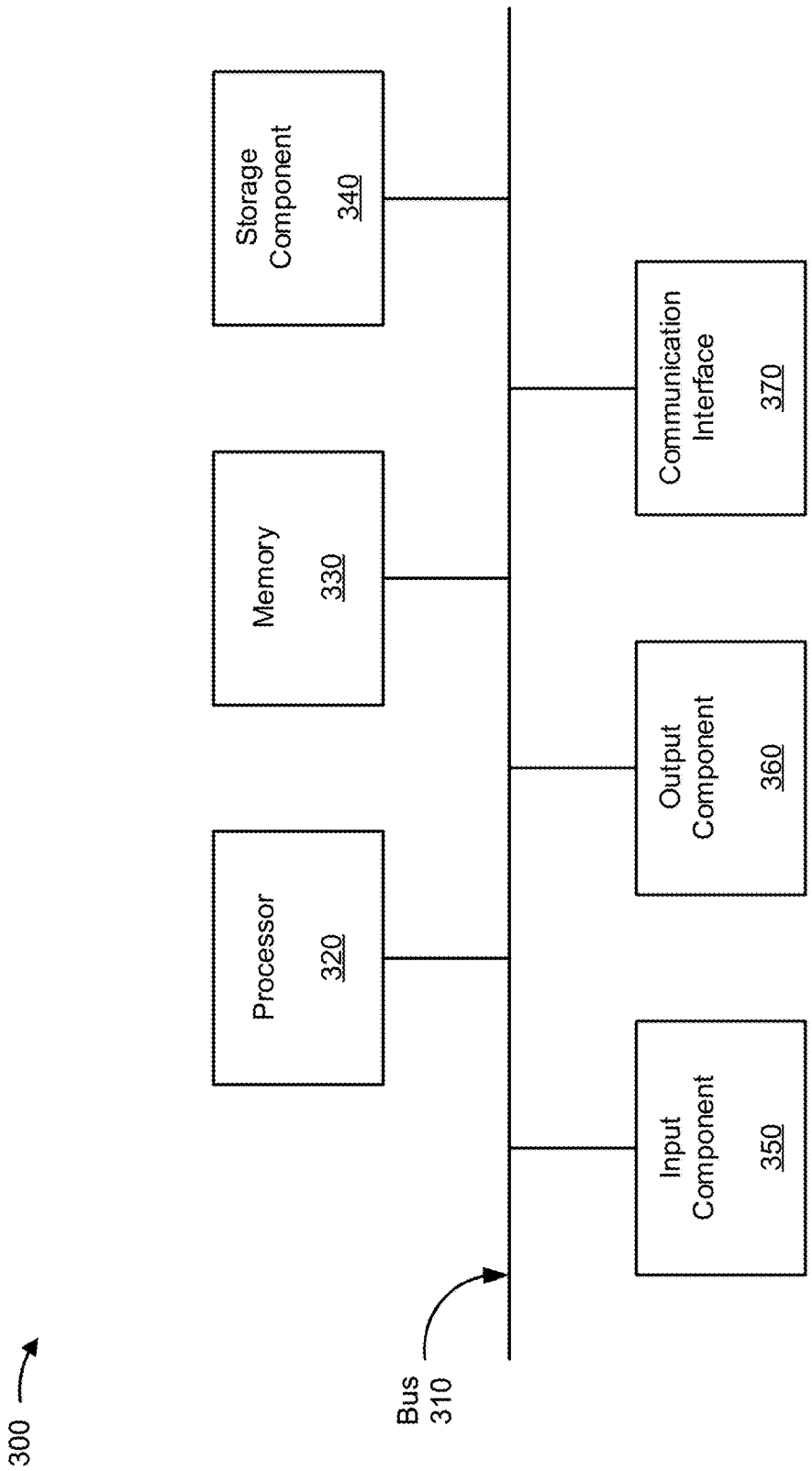
FIG. 3 is a diagram of example components of one or more devices of FIG. 2.

FIG. 3 is a diagram of example components of a device 300. Device 300 may correspond to client device 210, web server 220, and/or web accessibility platform 230. In some implementations, client device 210, web server 220, and/or web accessibility platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
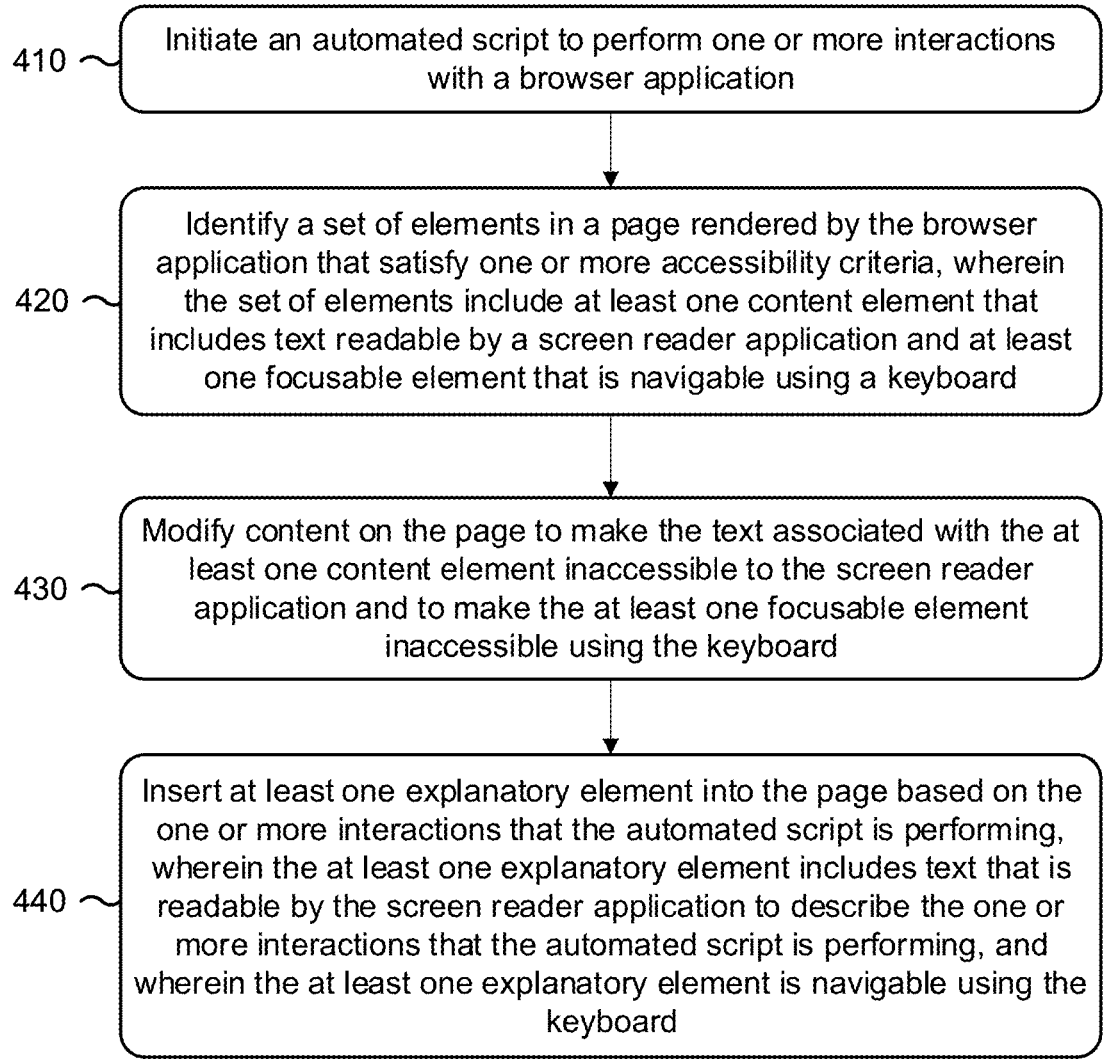
FIGS. 4-6 are flow charts of example processes for modifying readable and focusable elements on a page during execution of automated scripts.

FIG. 4 is a flow chart of an example process 400 for modifying readable and focusable elements on a page during execution of automated scripts. In some implementations, one or more process blocks of FIG. 4 may be performed by a client device (e.g., client device 210). In some implementations, one or more process blocks of FIG. 4 may be performed by another device or a group of devices separate from or including the client device, such as a web server (e.g., web server 220), a web accessibility platform (e.g., web accessibility platform 230), and/or the like.

As shown in FIG. 4, process 400 may include initiating an automated script to perform one or more interactions with a browser application (block 410). For example, the client device (e.g., using computing resource 245, processor 320, memory 330, storage component 340, input component 350, output component 360, communication interface 370, and/or the like) may initiate an automated script to perform one or more interactions with a browser application, as described above.

As further shown in FIG. 4, process 400 may include identifying a set of elements in a page rendered by the browser application that satisfy one or more accessibility criteria, wherein the set of elements include at least one content element that includes text readable by a screen reader application and at least one focusable element that is navigable using a keyboard (block 420). For example, the client device (e.g., using computing resource 245, processor 320, memory 330, storage component 340, input component 350, output component 360, communication interface 370, and/or the like) may identify a set of elements in a page rendered by the browser application that satisfy one or more accessibility criteria, as described above. In some implementations, the set of elements include at least one content element that includes text readable by a screen reader application and at least one focusable element that is navigable using a keyboard.

As further shown in FIG. 4, process 400 may include modifying content on the page to make the text associated with the at least one content element inaccessible to the screen reader application and to make the at least one focusable element inaccessible using the keyboard (block 430). For example, the client device (e.g., using computing resource 245, processor 320, memory 330, storage component 340, input component 350, output component 360, communication interface 370, and/or the like) may modify content on the page to make the text associated with the at least one content element inaccessible to the screen reader application and to make the at least one focusable element inaccessible using the keyboard, as described above.

As further shown in FIG. 4, process 400 may include inserting at least one explanatory element into the page based on the one or more interactions that the automated script is performing, wherein the at least one explanatory element includes text that is readable by the screen reader application to describe the one or more interactions that the automated script is performing, and wherein the at least one explanatory element is navigable using the keyboard (block 440). For example, the client device (e.g., using computing resource 245, processor 320, memory 330, storage component 340, input component 350, output component 360, communication interface 370, and/or the like) may insert at least one explanatory element into the page based on the one or more interactions that the automated script is performing, as described above. In some implementations, the at least one explanatory element includes text that is readable by the screen reader application to describe the one or more interactions that the automated script is performing. In some implementations, the at least one explanatory element is navigable using the keyboard.

Process 400 may include additional implementations, such as any single implementation or any combination of implementations described below and/or in connection with one or more other processes described elsewhere herein.

In some implementations, the client device may cache an original state of the content on the page and restore the cached original state of the content on the page based on determining that the automated script has finished executing. In some implementations, when caching the original state of the content on the page, the client device may store an original state of the at least one content element in association with a first unique identifier and store an original state of the at least one focusable element in association with a second unique identifier. In some implementations, the first unique identifier and the second unique identifier may be used to restore the original state of the at least one content element and the original state of the at least one focusable element when the automated script has finished executing.

In some implementations, the client device may store, in a cache, an original state of the content on the page, and the original state of the content on the page may be removed from the cache based on determining that the automated script has caused the browser application to load a new page.

In some implementations, the text associated with the at least one content element may be defined in one or more of an attribute associated with the at least one content element or a section between an opening tag and a closing tag of the at least one content element.

In some implementations, when modifying the content on the page to make the at least one focusable element inaccessible using the keyboard, the client device may associate the at least one focusable element with an attribute that causes the at least one focusable element to be omitted from a sequence of elements that are navigable using the keyboard.

In some implementations, the client device may detect multimedia on the page that is configured to automatically play, and the content on the page may be further modified to disable the multimedia and to make the multimedia inaccessible to the screen reader application and the keyboard.

In some implementations, the set of elements may further include at least one interactive element. In some implementations, the content on the page is further modified to make the at least one interactive element non-interactive.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
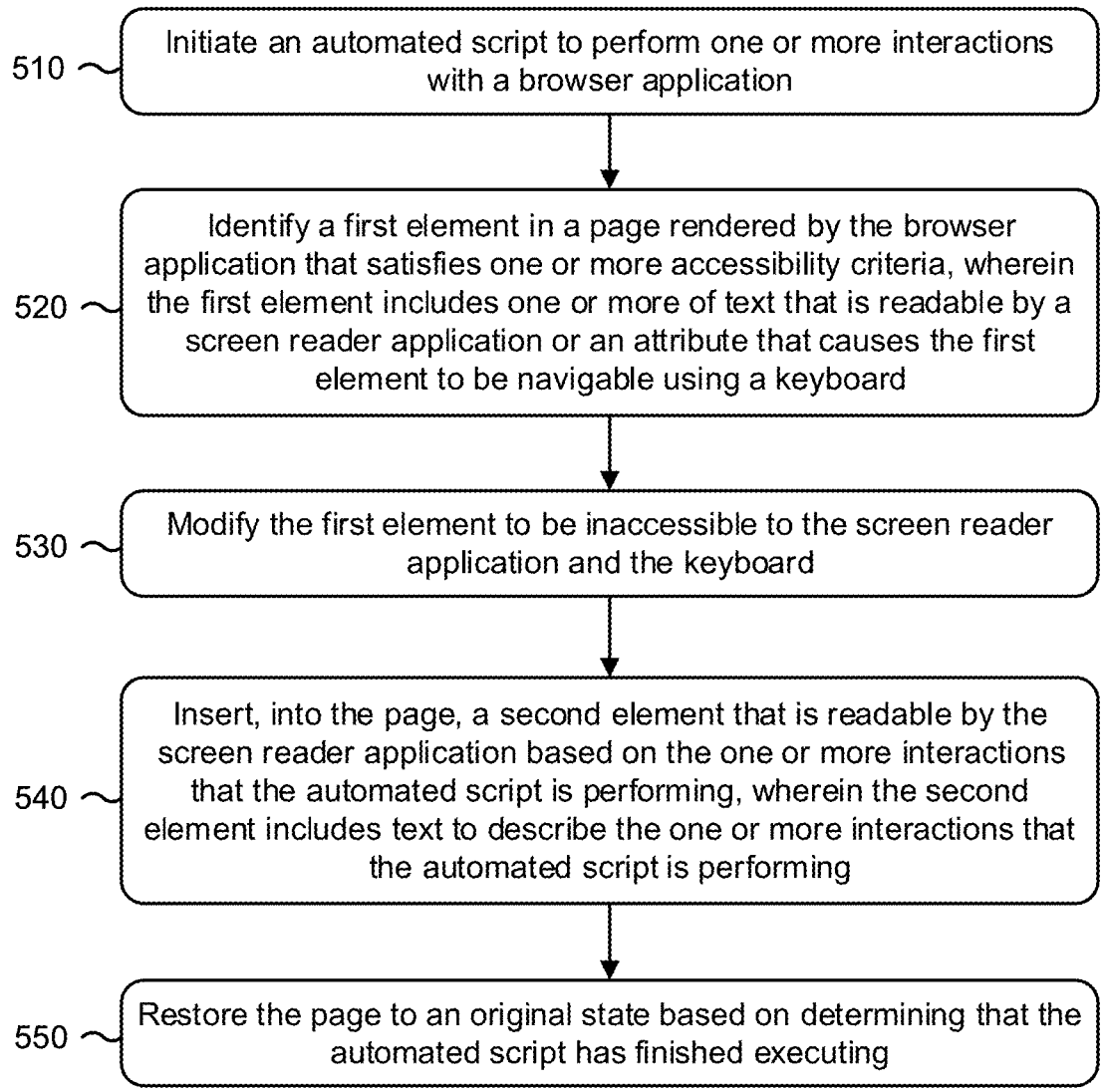

FIG. 5 is a flow chart of an example process 500 for modifying readable and focusable elements on a page during execution of automated scripts. In some implementations, one or more process blocks of FIG. 5 may be performed by a client device (e.g., client device 210). In some implementations, one or more process blocks of FIG. 5 may be performed by another device or a group of devices separate from or including the client device, such as a web server (e.g., web server 220), a web accessibility platform (e.g., web accessibility platform 230), and/or the like.

As shown in FIG. 5, process 500 may include initiating an automated script to perform one or more interactions with a browser application (block 510). For example, the client device (e.g., using computing resource 245, processor 320, memory 330, storage component 340, input component 350, output component 360, communication interface 370, and/or the like) may initiate an automated script to perform one or more interactions with a browser application executing, as described above.

As further shown in FIG. 5, process 500 may include identifying a first element in a page rendered by the browser application that satisfies one or more accessibility criteria wherein the first element includes one or more of text that is readable by a screen reader application or an attribute that causes the first element to be navigable using a keyboard (block 520). For example, the client device (e.g., using computing resource 245, processor 320, memory 330, storage component 340, input component 350, output component 360, communication interface 370, and/or the like) may identify a first element in a page rendered by the browser application that satisfies one or more accessibility criteria, as described above. In some implementations, the first element includes one or more of text that is readable by a screen reader application or an attribute that causes the first element to be navigable using a keyboard.

As further shown in FIG. 5, process 500 may include modifying the first element to be inaccessible to the screen reader application and the keyboard (block 530). For example, the client device (e.g., using computing resource 245, processor 320, memory 330, storage component 340, input component 350, output component 360, communication interface 370, and/or the like) may modify the first element to be inaccessible to the screen reader application and the keyboard, as described above.

As further shown in FIG. 5, process 500 may include inserting, into the page, a second element that is readable by the screen reader application based on the one or more interactions that the automated script is performing, wherein the second element includes text to describe the one or more interactions that the automated script is performing (block 540). For example, the client device (e.g., using computing resource 245, processor 320, memory 330, storage component 340, input component 350, output component 360, communication interface 370, and/or the like) may insert, into the page, a second element that is readable by the screen reader application based on the one or more interactions that the automated script is performing, as described above. In some implementations, the second element includes text to describe the one or more interactions that the automated script is performing.

As further shown in FIG. 5, process 500 may include restoring the page to an original state based on determining that the automated script has finished executing (block 550). For example, the client device (e.g., using computing resource 245, processor 320, memory 330, storage component 340, input component 350, output component 360, communication interface 370, and/or the like) may restore the page to an original state based on determining that the automated script has finished executing, as described above.

Process 500 may include additional implementations, such as any single implementation or any combination of implementations described below and/or in connection with one or more other processes described elsewhere herein.

In some implementations, the client device may store, in one or more memories, the original state of the page prior to modifying the first element and inserting the second element. In some implementations, the original state of the page may be obtained from the one or more memories and used to restore the page to the original state. In some implementations, when storing the original state of the page, the client device may associate an original state of the first element with a unique identifier and associate the first element with the unique identifier after modifying the first element. In some implementations, the unique identifier may be used to restore the first element to the original state of the first element when the automated script has finished executing.

In some implementations, the first element may be modified to include an attribute that causes the second element to be omitted from a sequence of elements that are navigable using the keyboard. In some implementations, the second element may be associated with an attribute that causes the second element to be first in a sequence of elements that are navigable using the keyboard.

In some implementations, the client device may provide information related to the original state of the page and information related to one or more modifications to the first element to another device configured to update the one or more accessibility criteria based on the information related to the original state of the page and the one or more modifications to the first element.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
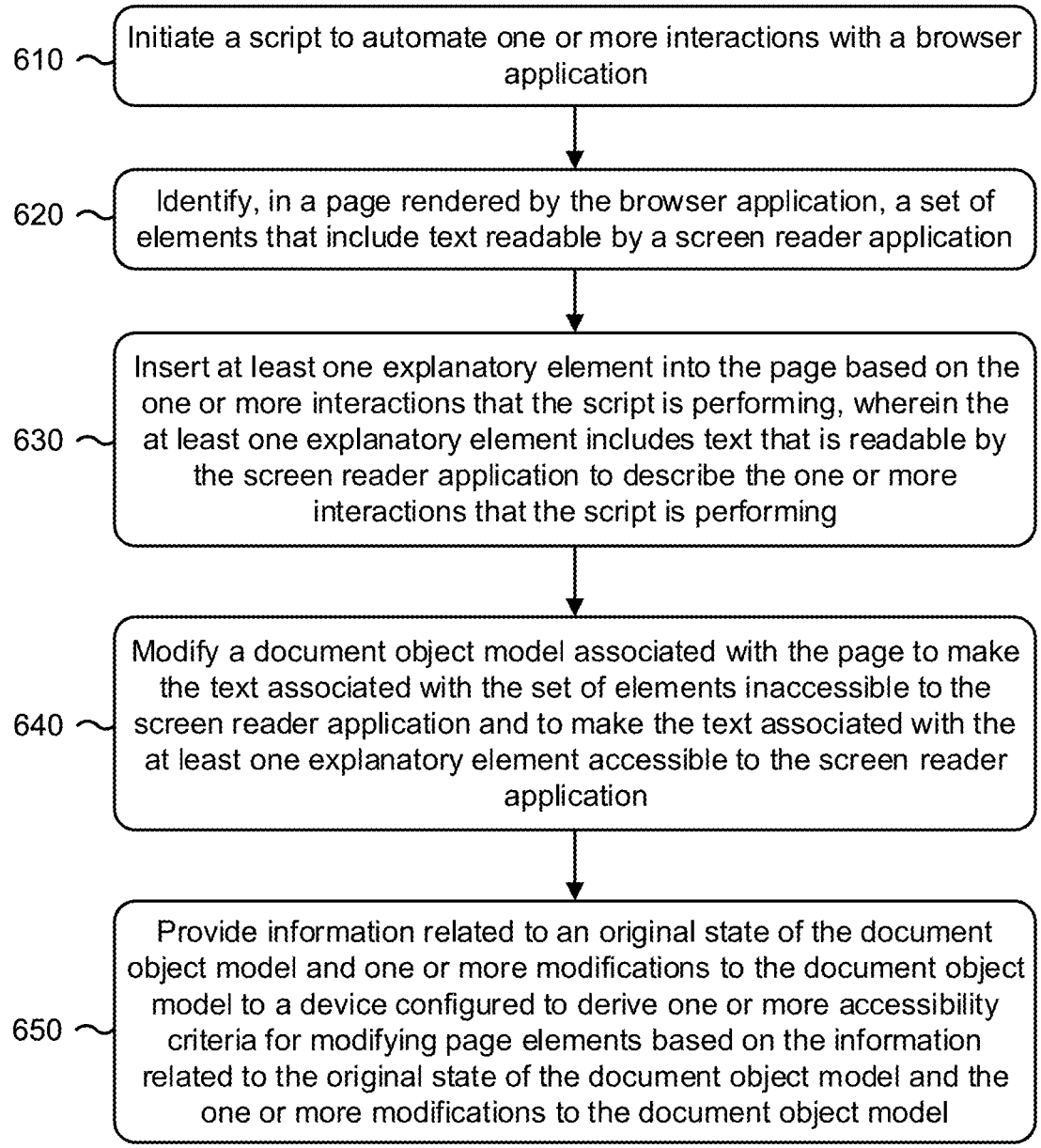

FIG. 6 is a flow chart of an example process 600 for modifying readable and focusable elements on a page during execution of automated scripts. In some implementations, one or more process blocks of FIG. 6 may be performed by a client device (e.g., client device 210). In some implementations, one or more process blocks of FIG. 6 may be performed by another device or a group of devices separate from or including the client device, such as a web server (e.g., web server 220), a web accessibility platform (e.g., web accessibility platform 230), and/or the like.

As shown in FIG. 6, process 600 may include initiating a script to automate one or more interactions with a browser application (block 610). For example, the client device (e.g., using computing resource 245, processor 320, memory 330, storage component 340, input component 350, output component 360, communication interface 370, and/or the like) may initiate a script to automate one or more interactions with a browser application, as described above.

As further shown in FIG. 6, process 600 may include identifying, in a page rendered by the browser application, a set of elements that include text readable by a screen reader application (block 620). For example, the client device (e.g., using computing resource 245, processor 320, memory 330, storage component 340, input component 350, output component 360, communication interface 370, and/or the like) may identify, in a page rendered by the browser application, a set of elements that include text readable by a screen reader application, as described above.

As further shown in FIG. 6, process 600 may include inserting at least one explanatory element into the page based on the one or more interactions that the script is performing, wherein the at least one explanatory element includes text that is readable by the screen reader application to describe the one or more interactions that the script is performing (block 630). For example, the client device (e.g., using computing resource 245, processor 320, memory 330, storage component 340, input component 350, output component 360, communication interface 370, and/or the like) may insert at least one explanatory element into the page based on the one or more interactions that the script is performing, as described above. In some implementations, the at least one explanatory element includes text that is readable by the screen reader application to describe the one or more interactions that the script is performing.

As further shown in FIG. 6, process 600 may include modifying a document object model associated with the page to make the text associated with the set of elements inaccessible to the screen reader application and to make the text associated with the at least one explanatory element accessible to the screen reader application (block 640). For example, the client device (e.g., using computing resource 245, processor 320, memory 330, storage component 340, input component 350, output component 360, communication interface 370, and/or the like) may modify a document object model associated with the page to make the text associated with the set of elements inaccessible to the screen reader application and to make the text associated with the at least one explanatory element accessible to the screen reader application, as described above.

As further shown in FIG. 6, process 600 may include providing information related to an original state of the document object model and one or more modifications to the document object model to a device configured to derive one or more accessibility criteria for modifying page elements based on the information related to the original state of the document object model and the one or more modifications to the document object model (block 650). For example, the client device (e.g., using computing resource 245, processor 320, memory 330, storage component 340, input component 350, output component 360, communication interface 370, and/or the like) may provide information related to an original state of the document object model and one or more modifications to the document object model to a device configured to derive one or more accessibility criteria for modifying page elements based on the information related to the original state of the document object model and the one or more modifications to the document object model, as described above.

Process 600 may include additional implementations, such as any single implementation or any combination of implementations described below and/or in connection with one or more other processes described elsewhere herein.

In some implementations, the text readable by the screen reader application may be defined in one or more of an attribute that describes a content element or a section between an opening tag and a closing tag of the content element.

In some implementations, the client device may associate each element in the set of elements with an attribute having a negative value to cause the set of elements to be omitted from a sequence of elements that are navigable using a keyboard. In some implementations, the client device may associate the at least one explanatory element with an attribute having a value to cause the at least one explanatory element to be first in a sequence of elements that are navigable using a keyboard.

In some implementations, the client device may detect multimedia that the page is configured to automatically play, and the client device may make the multimedia inaccessible to the screen reader application.

In some implementations, the set of elements may further include at least one interactive element, and the document object model associated with the page may be further modified to make the at least one interactive element non-interactive.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
  initiate an automated script to perform one or more interactions with a browser application executing on the device;
  identify a first element in a page rendered by the browser application that satisfies one or more accessibility criteria,
    wherein the first element includes one or more of text that is readable by a screen reader application executing on the device or an attribute that causes the first element to be navigable using a keyboard;
  modify the first element to be inaccessible to the screen reader application and the keyboard,
    wherein the first element is to be modified to include an attribute that causes a second element to be omitted from a sequence of elements that are navigable using the keyboard;
  insert, into the page, the second element that is readable by the screen reader application based on the one or more interactions that the automated script is performing,
    wherein the second element includes text to describe the one or more interactions that the automated script is performing; and
  restore the page to an original state based on determining that the automated script has finished executing.

2. The device of claim 1, wherein the one or more processors are further configured to:
store, in the one or more memories, the original state of the page prior to modifying the first element and inserting the second element,
  wherein the original state of the page is to be obtained from the one or more memories and used to restore the page to the original state.

3. The device of claim 2, wherein the one or more processors, when storing the original state of the page, are further configured to:
associate an original state of the first element with a unique identifier; and
associate the first element with the unique identifier after modifying the first element,
  wherein the unique identifier is used to restore the first element to the original state of the first element when the automated script has finished executing.

4. The device of claim 1, wherein the second element is associated with an attribute that causes the second element to be first in a sequence of elements that are navigable using the keyboard.

5. The device of claim 1, wherein the one or more processors are further configured to:
provide information related to the original state of the page and information related to one or more modifications to the first element to another device configured to update the one or more accessibility criteria based on the information related to the original state of the page and the one or more modifications to the first element.

6. The device of claim 1, wherein the one or more processors are further configured to:
cache an original state of content on the page; and
restore the cached original state of the content on the page based on determining that the automated script has finished executing.

7. A non-transitory computer-readable medium storing instructions, the instructions comprising:
one or more instructions that, when executed by one or more processors on a device, cause the one or more processors to:
initiate an automated script to perform one or more interactions with a browser application executing on the device;
identify a first element in a page rendered by the browser application that satisfies one or more accessibility criteria,
wherein the first element includes one or more of text that is readable by a screen reader application executing on the device or an attribute that causes the first element to be navigable using a keyboard;
modify the first element to be inaccessible to the screen reader application and the keyboard,
wherein the first element is to be modified to include an attribute that causes a second element to be omitted from a sequence of elements that are navigable using the keyboard;
insert, into the page, the second element that is readable by the screen reader application based on the one or more interactions that the automated script is performing,
wherein the second element includes text to describe the one or more interactions that the automated script is performing; and
restore the page to an original state based on determining that the automated script has finished executing.

8. The non-transitory computer-readable medium of claim 7, wherein the one or more instructions, when executed by the one or more processors, further cause the one or more processors to:
store, in a memory, the original state of the page prior to modifying the first element and inserting the second element,
wherein the original state of the page is to be obtained from memory and used to restore the page to the original state.

9. The non-transitory computer-readable medium of claim 8, wherein the one or more instructions, when storing the original state of the page, cause the one or more processors to:
associate an original state of the first element with a unique identifier; and
associate the first element with the unique identifier after modifying the first element,
wherein the unique identifier is used to restore the first element to the original state of the first element when the automated script has finished executing.

10. The non-transitory computer-readable medium of claim 7, wherein the one or more instructions, when executed by the one or more processors, further cause the one or more processors to:
associate the second element with an attribute having a value to cause the second element to be first in a sequence of elements that are navigable using the keyboard.

11. The non-transitory computer-readable medium of claim 7, wherein the one or more instructions, when executed by the one or more processors, further cause the one or more processors to:
detect multimedia that the page is configured to automatically play; and
make the multimedia inaccessible to the screen reader application.

12. The non-transitory computer-readable medium of claim 7, wherein the one or more instructions, when executed by the one or more processors, further cause the one or more processors to:
provide information related to the original state of the page and information related to one or more modifications to the first element to another device configured to update the one or more accessibility criteria based on the information related to the original state of the page and the one or more modifications to the first element.

13. The non-transitory computer-readable medium of claim 7, wherein the one or more instructions, when executed by the one or more processors, further cause the one or more processors to:
cache an original state of content on the page; and
restore the cached original state of the content on the page based on determining that the automated script has finished executing.

14. A method comprising:
initiating, by a device, an automated script to perform one or more interactions with a browser application executing on the device;
identifying, by the device, a first element in a page rendered by the browser application that satisfies one or more accessibility criteria,
wherein the first element includes one or more of text that is readable by a screen reader application executing on the device or an attribute that causes the first element to be navigable using a keyboard;
modifying, by the device, the first element to be inaccessible to the screen reader application and the keyboard,
wherein the first element is to be modified to include an attribute that causes a second element to be omitted from a sequence of elements that are navigable using the keyboard;
inserting, by the device and into the page, the second element that is readable by the screen reader application based on the one or more interactions that the automated script is performing,
wherein the second element includes text to describe the one or more interactions that the automated script is performing; and
restoring, by the device, the page to an original state based on determining that the automated script has finished executing.

15. The method of claim 14, further comprising:
storing, in a memory, the original state of the page prior to modifying the first element and inserting the second element,
wherein the original state of the page is to be obtained from the memory and used to restore the page to the original state.

16. The method of claim 15, where storing the original state of the page comprises:
associating an original state of the first element with a unique identifier; and
associating the first element with the unique identifier after modifying the first element,
wherein the unique identifier is used to restore the first element to the original state of the first element when the automated script has finished executing.

17. The method of claim 14, further comprising:
storing, in a cache, an original state of content on the page; and
removing the original state of content on the page from the cache based on determining that the automated script has caused the browser application to load a new page.

18. The method of claim 14, wherein the second element is associated with an attribute that causes the second element to be first in a sequence of elements that are navigable using the keyboard.

19. The method of claim 14, further comprising:
detecting multimedia on the page that is configured to automatically play,
wherein content on the page is further modified to disable the multimedia and to make the multimedia inaccessible to the screen reader application and the keyboard.

20. The method of claim 14, further comprising:
caching an original state of content on the page; and
restoring the cached original state of the content on the page based on determining that the automated script has finished executing.

* * * * *